(12) United States Patent
Arnold et al.

(10) Patent No.: US 7,728,987 B2
(45) Date of Patent: Jun. 1, 2010

(54) METHOD OF MANUFACTURING AN OPTICAL ELEMENT

(75) Inventors: Ralf Arnold, Aalen (DE); Bernd Dörband, Aalen (DE); Frank Schillke, Aalen (DE); Susanne Beder, Aalen (DE)

(73) Assignee: Carl Zeiss SMT AG, Oberkochen (DE)

( * ) Notice: Subject to any disclaimer, the term of this patent is extended or adjusted under 35 U.S.C. 154(b) by 379 days.

(21) Appl. No.: 11/596,187

(22) PCT Filed: May 14, 2004

(86) PCT No.: PCT/EP2004/005194

§ 371 (c)(1),
(2), (4) Date: Oct. 23, 2007

(87) PCT Pub. No.: WO2005/114101

PCT Pub. Date: Dec. 1, 2005

(65) Prior Publication Data

US 2008/0043247 A1    Feb. 21, 2008

(51) Int. Cl.
*G01B 11/02* (2006.01)
(52) U.S. Cl. .................................. 356/511
(58) Field of Classification Search ......... 356/511–513, 356/515
See application file for complete search history.

(56) References Cited

U.S. PATENT DOCUMENTS

| | | |
|---|---|---|
| 4,340,306 A | 7/1982 | Balasubramanian |
| 4,732,483 A | 3/1988 | Biegen |
| 4,758,089 A | 7/1988 | Yokokura et al. |
| 5,361,312 A | 11/1994 | Kuchel |
| 5,473,434 A | 12/1995 | de Groot |
| 5,488,477 A | 1/1996 | de Groot |
| 5,548,403 A | 8/1996 | Sommargren |
| 5,777,741 A | 7/1998 | Deck |

(Continued)

FOREIGN PATENT DOCUMENTS

JP    8-110214 A    4/1996

(Continued)

OTHER PUBLICATIONS

International Search Report of PCT/EP2004/005194, Jan. 28, 2005, Carl Zeiss SMT AG.

(Continued)

*Primary Examiner*—Tarifur Chowdhury
*Assistant Examiner*—Jonathan M Hansen
(74) *Attorney, Agent, or Firm*—Sughrue Mion, PLLC

(57) ABSTRACT

A method of manufacturing an optical element includes testing the optical element by using an interferometer optics generating a beam of measuring light illuminating only a sub-aperture of the tested optical element. The interferometer optics comprises a hologram. Results of the sub-aperture measurement are stitched together to obtain a measuring result with respect to the full surface of the optical element. Further, a method of calibrating the interferometer optics includes performing an interferometric measurement using a calibrating optics having a hologram covering only a sub-aperture of the full cross section of the beam of measuring light generated by the interferometer optics and stitching together the sub-aperture measurements to obtain a result indicative for the full cross section of the interferometer optics.

18 Claims, 6 Drawing Sheets

U.S. PATENT DOCUMENTS

| | | | |
|---|---|---|---|
| 5,982,490 | A | 11/1999 | Ichikawa et al. |
| 7,061,626 | B1 | 6/2006 | Schillke et al. |
| 2002/0063867 | A1 | 5/2002 | Otto |
| 2003/0002048 | A1* | 1/2003 | Zanoni ............... 356/512 |
| 2003/0117632 | A1* | 6/2003 | Golini et al. ......... 356/512 |
| 2003/0128368 | A1* | 7/2003 | Kuchel ............... 356/512 |
| 2003/0184762 | A1* | 10/2003 | Kim et al. ........... 356/512 |
| 2004/0174531 | A1* | 9/2004 | Freimann ............ 356/512 |
| 2005/0083537 | A1* | 4/2005 | Kuchel ............... 356/513 |
| 2005/0275849 | A1 | 12/2005 | Freimann et al. |

FOREIGN PATENT DOCUMENTS

| | | |
|---|---|---|
| JP | 2002/011656 | 1/2002 |
| JP | 2002-011656 | 1/2002 |
| JP | 2003057016 A | 2/2003 |
| WO | WO 03/040650 A1 | 5/2003 |
| WO | WO 2004/046641 A1 | 6/2004 |

OTHER PUBLICATIONS

Bray, "Stitching Interferometer for Large Plano Optics Using a Standard Interferometer," SPIE; 3134:39-50 (1997).

Bray, "Stitching Interferometer for Large Optics Using a Standard Interferometer. Description of an Automated System," SPIE, 3047:911-918 (1997).

Bray, "Stitching Interferometer for Large Optics: Recent Developments of a System," SPIE, 3492:946-956 (1999).

Bray, "Stitching Interferometry: How and Why It Works," SPIE, 3739:259-273 (1999).

Bray, "Stitching Interferometry: Side Effects and PSD", SPIE, 3782:443-452 (1999).

Bray, "Stitching Interferometry for the Wavefront Metrology of X-Ray Mirrors," SPIE, 4501:63-67 (2001).

Bray, "Stitching Interferometry and Absolute Surface Shape Metrology: Similarities," SPIE, 4451:375-383 (2001).

Hansel et al., "Stitching Interferometry of Aspherical Surfaces," SPIE, 4449:265-275 (2001).

Freimann et al., "Absolute Measurement of Non-Comatic Aspheric Surface Errors," Optics Communications, 161:106-114(1999).

MacGovern et al., "Computer Generated Holograms for Testing Optical Elements," 10(3):619-624 (1971).

Malacara, Optical Shop Testing, $2^{nd}$ Ed., John Wiley & Sons, Inc., Chapters 2.1, 2.6, and 12 (1992).

Naulleau et al., "Extreme-Ultraviolet Phase-Shifting Point-Diffraction Interferometer: A Wave-Front Metrology Tool with Subangstrom Reference-Wave Accuracy," 38(35):7252-7263 (1999).

* cited by examiner

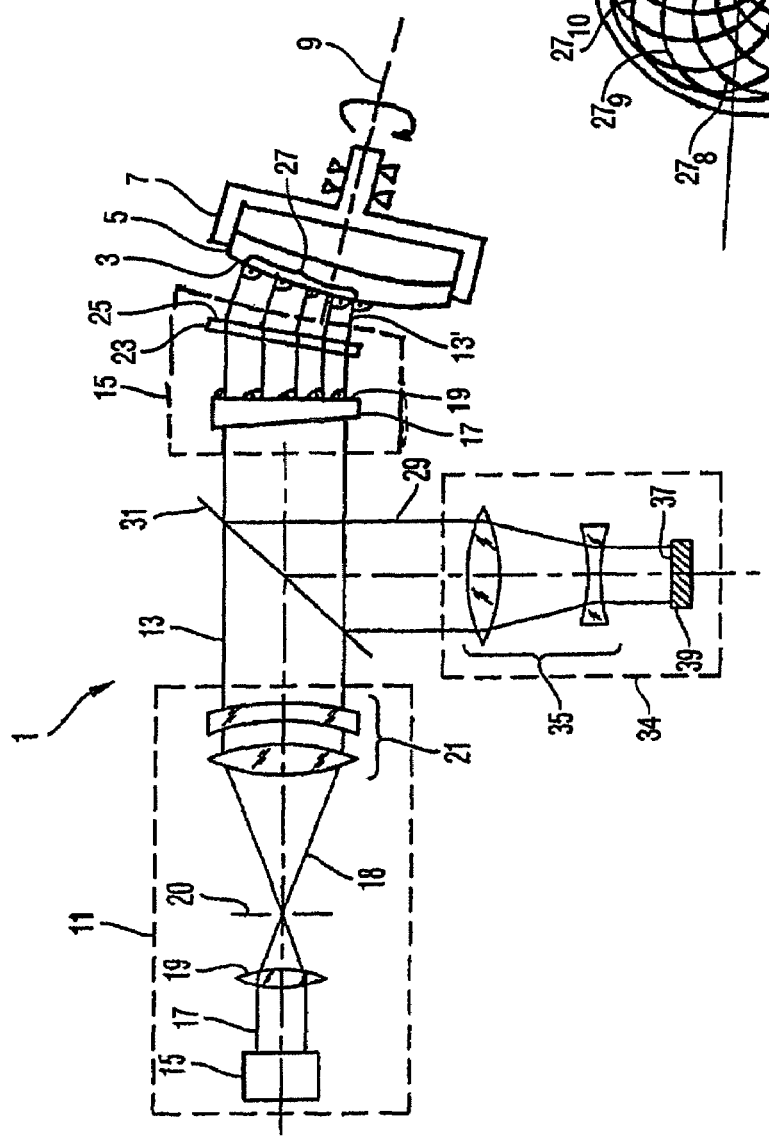

METHOD OF MANUFACTURING AN OPTICAL ELEMENT

This application is a national stage application under 35 U.S.C. 371 of International Application No. PCT/EP2004/005194 filed May 14, 2004, the entire contents of which are incorporated herein by reference.

BACKGROUND OF THE INVENTION

1. Field of the Invention

The present invention relates to a method of manufacturing an optical element. In particular, the invention relates to a method of manufacturing an optical element having an aspherical optical surface having a rotational symmetry.

2. Brief Description of Related Art

The optical element having the optical surface is, for example, an optical component such as an optical lens or an optical mirror used in optical systems, such as telescopes used in astronomy, and systems used for imaging structures, such as structures formed on a mask or reticle, onto a radiation sensitive substrate, such as a resist, in a lithographic method. The success of such an optical system is substantially determined by the accuracy with which the optical surface can be machined or manufactured to have a target shape determined by a designer of the optical system. In such manufacture it is necessary to compare the shape of the machined optical surface with its target shape, and to determine differences between the machined and target surfaces. The optical surface may then be further machined at those portions where differences between the machined and target surfaces exceed e.g. predefined thresholds.

Interferometric apparatuses are commonly used for high precision measurements of optical surfaces. Examples of such apparatus are disclosed in U.S. Pat. No. 4,732,483, U.S. Pat. No. 4,340,306, U.S. Pat. No. 5,473,434, U.S. Pat. No. 5,777,741, U.S. Pat. No. 5,488,477. The entire contents of these documents are incorporated herein by reference.

The conventional interferometer apparatus for measuring a spherical optical surface typically includes a source of sufficiently coherent light and an interferometer optics for generating a beam of measuring light incident on the surface to be tested, such that wave fronts of the measuring light have, at a position of the surface to be tested, a same shape as the target shape of the surface under test. In such a situation, the beam of measuring light is orthogonally incident on the surface under test, and is reflected therefrom to travel back towards the interferometer optics. Thereafter, the light of the measuring beam reflected from the surface under test is superimposed with light reflected from a reference surface and deviations of the shape of the surface under test and its target shape are determined from a resulting interference pattern.

While spherical wave fronts for testing spherical optical surfaces may be generated with a relatively high precision by conventional interferometer optics, more advanced optics, which are also referred to as compensators, null lens arrangements, or K-systems, are necessary to generate beams of measuring light having aspherical wave fronts such that the light is orthogonally incident at each location of the aspherical surface under test. Background information relating to null lens arrangements or compensators is available e.g. from the text book of Daniel Malacara "Optical Shop Testing", $2^{nd}$ Edition, John Wiley & Sons, Inc. 1992, Chapter 12.

For many types of aspherical optical surfaces to be tested it is necessary to provide a null lens system or a compensator having one or more lenses with a diameter which corresponds to a diameter of the aspherical surface under test. In particular, for aspherical surfaces having a convex shape, the diameters of lenses of the compensator may have to be greater than the diameter of the aspherical lens.

Manufacture of null lens systems having lenses with a great diameter and having a high accuracy is a considerable problem and not only incurs high costs. From the article by M. Bray, "Stitching interferometer for large optics: Recent Developments of a System for Laser Megajoule Components", Lawrence Livermore Nat. Lab., CEA. in Proc. SPIE—Int. Soc. Opt. Eng. (USA), USA: SPIE—Int. Soc. Opt. Eng., vol. 3492, pt. 1-2[+suppl.], 1999, pages 946-956, there is known a method of testing a large mirror having a spherical shape by performing interferometric tests at a plurality of overlapping portions or sub-apertures of the optical surface to be tested. Each portion has a lower diameter than the surface to be tested. Measured surface data of each portion are then stitched together to generate surface data representing a map of the surface shape of the tested mirror. The data processing for stitching the various data portions includes determining magnitudes of a piston term, a tilt, and a lateral translation between adjacent overlapping portions. This is possible since the mirror has a spherical shape such that each measured portion of the whole surface represents a small portion of the overall sphere and all portions may be stitched together to represent the overall sphere by determining only the respective parameters mentioned above, i.e. piston, tilt and lateral translation.

While the method of stitching interferometry is useful in measuring large spherical optical surfaces by using an interferometer optics of a lower diameter, applications of stitching interferometry to testing of large aspherical surfaces by using null lens systems or compensators having a low diameter did not provide satisfactory results in the past.

SUMMARY OF THE INVENTION

The present invention has been accomplished taking the above problems into consideration.

Thus, it is an object of the present invention to provide a method of testing and manufacturing an optical surface having a comparatively high diameter. Further, it is an object of the present invention to provide an improved method of testing and manufacturing aspherical optical surfaces which, in particular, may have a relatively high diameter.

The forgoing objects are accomplished by providing an interferometric method of testing an optical element having an optical surface of an aspherical rotationally symmetric target shape wherein a beam of measuring light traverses and is formed by a hologram, wherein the beam of measuring light is incident, at a particular time, only on a portion of the optical surface to be measured, wherein measuring results associated with each portion are stitched together to determine the surface shape of a larger portion of the optical surface, and wherein only lateral displacements of the optical surface relative to the beam of measuring light are performed by rotating the optical surface about an axis which substantially coincides with an axis of rotational symmetry of the target shape.

One problem of applying stitching interferometry to aspherical surfaces originates from the fact that the aspherical surface shape is a non-uniform surface shape, such that shapes of adjacent portions of the aspherical surface differ from each other to such a large extent that a sufficient analysis of interference patterns generated by testing certain portions of the aspherical shape is not possible. The inventors have found, however, that adjacent portions which are displaced from each other in a circumferential direction about an axis of rotation of a rotationally symmetric aspherical surface have a substantially same shape, such that a great number of portions displaced in a circumferential direction about the axis of symmetry may be analysed with respect to surface shape, based on an analysis of plural interference patterns each generated by testing individual portions, if it is possible to obtain an interference pattern from such individual portion which may be readily analysed. For this purpose, it is necessary to generate a beam of measuring light incident on the tested portion of the optical surface wherein the beam of measuring light has wave fronts substantially corresponding to the aspherical surface shape at the location of the illuminated portion such that the light is orthogonally incident at each location of the illuminated portion. Generally, such surface shape and shape of the wave fronts, respectively, will differ from a spherical shape. In particular, such shapes of wave fronts will have no axis of rotational symmetry for the whole cross section of the beam of measuring light incident on the illuminated portion of the optical element, and it was not easy to design a null lens arrangement or compensator for generating such types of wave fronts since the conventional null lens arrangement or compensator includes one or plural lenses having a rotationally symmetry.

The inventors found that a hologram, or optical grating may be advantageously used for designing a null lens system or compensator for generating wave fronts of a shape corresponding to a shape of a portion of the aspherical surface as desired. Thus, by using a suitably designed hologram or optical grating for generating the beam of measuring light, and by translating the optical surface under test between individual measurements of portions of the optical surface in the circumferential direction about the axis of symmetry of the aspherical surface, it was possible to apply the method of stitching interferometry to testing of aspherical lenses.

Stitching interferometry involves interferometric testing of only a portion or sub-aperture of the whole surface or full aperture of the surface to be tested at the same time, such that the area of the illuminated portion or sub-aperture is, according to a particular embodiment, less than about 80% or less than about 50% of a total area or full aperture of the optical surface.

According to an embodiment, deviations of the optical surface from its target shape are determined in dependence of the plural interferometric measurements of sub-apertures, and a machining of the optical surface of the optical element is performed in dependence of the determined deviations to achieve a surface shape of the optical element which better corresponds to a target shape of the optical element.

According to an embodiment of the invention, the illuminated portion or sub-aperture of the optical surface includes a region about the axis of rotation. Thus, measurements of each sub-aperture contain a common region of the optical surface, and the stitching of the measured surface shapes to form the measured shape of the total surface of the optical surface may be performed with an improved accuracy.

According to an exemplary embodiment of the invention, the interferometer optics further comprises at least one first lens traversed by the beam of measuring light, and this lens is disposed upstream or downstream of the hologram in the beam of measuring light, and wherein the at least one lens has an axis of rotational symmetry. This allows the provision of a substantial amount of necessary power for forming or shaping the beam of measuring light by the refractive power of the lens rather than a diffractive power of the hologram.

Herein, according to a further embodiment, the hologram is provided on a substantially flat substrate disposed downstream of the at least one first lens in the beam of measuring light and extending in a plane oriented at an angle different from 90° with respect to the optical axis. The hologram may then include a carrier frequency resulting in a substantial deflection of the beam by traversing the hologram, and this embodiment may have an advantage of an improved accuracy in manufacturing the hologram to have the desired effect on the wave fronts of the beam of measuring light.

Herein, according to an exemplary embodiment, the axis of rotation may be arranged parallel to the optical axis of the at least one first lens which may have an advantage of an accurate alignment of the components with respect to each other.

According to an exemplary embodiment, the interferometer optics includes plural substrates, each carrying a hologram, wherein the plural substrates are disposed adjacent to each other in the beam of measuring light.

According to a further exemplary embodiment, the interferometer optics includes plural substrates, each carrying a hologram, wherein the plural substrates are disposed adjacent to each other such that each substrate is traversed by a separate beam of measuring light, wherein each beam of measuring light is generated by a separate interferometer apparatus. This allows taking interferometric measurements at two or more sub-apertures of the full aperture of the optical surface at the same time. This may have an advantage of at least one of further reducing the time necessary for testing the full aperture of the optical element at the necessary plurality of rotational positions about the optical axis, further improving an achievable measuring accuracy, and having a possibility of using individual holograms of a reduced size.

According to a further aspect, the invention provides a method of calibrating an interferometer optics by applying principles of stitching interferometry to calibrating measurements using at least one hologram provided on a substrate disposed in only a portion of a beam of measuring light generated by the interferometer optics to be calibrated. Measuring light interacting with the hologram is superimposed with reference light to generate an interference pattern, and the substrate carrying the hologram is rotated about an axis of rotation.

According to an exemplary embodiment, an optical surface of an optical element to be manufactured is tested with the such calibrated interferometer optics, deviations of the optical surface from its target shape are determined in dependence of the plural measurements taken at the plural rotational positions of the calibrating optics and the at least one interferometric measurement of the optical surface.

According to an exemplary embodiment, the calibrating optics further comprises a mirror disposed at a distance from the substrate carrying the hologram. This may have an advantage in that the beam of measuring light is deflected by some deflective power of the hologram and reflected by the mirror. Alternatively, the hologram may be designed such that the beam of measuring light is both reflected and deflected by some angle due to the interaction with only the hologram. Compared to the embodiment using the mirror, the latter embodiment requires a higher diffractive power of the hologram.

Herein, according to an exemplary embodiment, the mirror is a convex mirror, such that some of the necessary deflection of the beam of measuring light is provided by the mirror rather than the hologram.

According to a further exemplary embodiment, the calibrating optics comprises plural substrates, each carrying a hologram and disposed adjacent to each other in the beam of measuring light. This may allow for increased accuracy in calibrating the interferometer optics and/or a reduced time necessary for performing the calibrating measurements at the necessary plurality of rotational positions of the calibrating optics about the axis of rotation and/or of having a possibility of using individual holograms of a reduced size.

According to an exemplary embodiment under both aspects of the invention, the interferometric measurement of the optical surface is performed such that the beam of measuring light is reflected from the optical surface. According to an alternative embodiment, the optical surface is tested by the beam of measuring light which traverses the optical surface and the optical element.

According to a further exemplary embodiment, the optical surface to be manufactured is an aspherical surface, i.e. has substantial deviations from a spherical shape such that a sufficiently accurate determining of a surface profile of the optical surface is not possible with interferometric methods which are suitable for testing spherical surfaces. Within the context of the present application, an optical surface may be referred to as an aspherical surface if the aspherical surface differs from its best approximating sphere by more than a predetermined criterion. One such criterion is based on a gradient of the difference between the aspherical surface and its best approximating sphere, and the optical surface is referred to as an aspherical surface if such gradient exceeds a value of 6 μm divided by an effective diameter of the optical surface.

The machining of the optical surface may comprise a machining such as milling, grinding, loose abrasive grinding, polishing, ion beam figuring, magneto-rheological figuring, reactive ion beam etching and finishing of the optical surface of the optical element.

According to an embodiment, the finishing comprises applying a coating to the optical surface. The coating may comprise a coating such as a reflective coating, an anti-reflective coating and a protective coating.

BRIEF DESCRIPTION OF THE DRAWINGS

The forgoing as well as other advantageous features of the invention will be more apparent from the following detailed description of exemplary embodiments of the invention with reference to the accompanying drawings, wherein:

FIG. 1 illustrates an interferometer system for testing an optical element using stitching interferometry according to a first embodiment of the invention;

FIG. 2 is an illustration indicating a plurality of sub-apertures of the optical element tested with the interferometer system shown in FIG. 1;

DETAILED DESCRIPTION OF EXEMPLARY EMBODIMENTS

Figure 3:
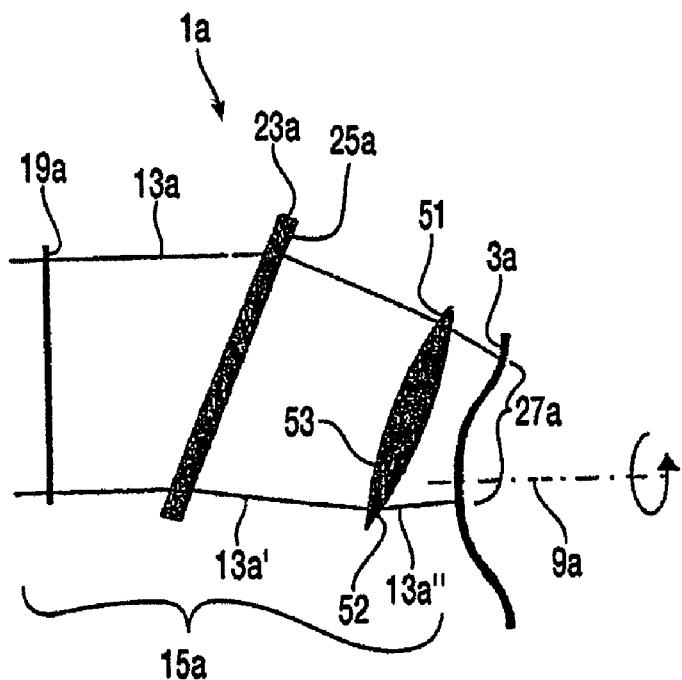
FIG. 3 schematically illustrates a portion of an interferometer system for testing an optical element according to a second embodiment of the invention.

In the exemplary embodiments described below, components that are alike in function and structure are designated as far as possible by alike reference numerals. Therefore, to understand the features of the individual components of a specific embodiment, the descriptions of other embodiments and of the summary of the invention should be referred to.

The exemplary embodiments of methods described below involve interferometrically taking measurements of wave fronts generated by reflecting an incident beam of measuring light provided by an interferometer apparatus from surfaces to be measured. Plural conventional interferometric methods may be used as a basis for taking such measurements. Examples of such interferometric methods are disclosed in e.g. U.S. Pat. No. 5,361,312, U.S. Pat. No. 5,982,490 and US 2002/0063867 A1. The entire contents of these patents and publications are incorporated herein by reference.

An interferometer system 1 according to an embodiment of the present invention is illustrated in FIG. 1. The interferometer system 1 is used for testing an aspherical mirror surface 3 of a mirror 5. The mirror 5 is mounted on a test piece holder 7 which is rotatable about an axis 9. The mirror surface 3 has a rotationally symmetric shape about an axis of symmetry, and the mirror 5 is aligned and mounted on the test piece holder such that the axis of symmetry of the surface 3 substantially coincides with the axis of rotation 9 of the test piece holder 7.

The interferometer system 1 comprises a light source 11 for generating beam 13 of measuring light. The light source 11 comprises a helium neon laser 15 emitting a laser beam 17. Beam 17 is focused by a focusing lens 19 onto a pin hole aperture of a spatial filter 20 such that a diverging beam 18 of coherent light emerges from the pin hole. Wave fronts in diverging beam 18 are substantially spherical wave fronts. The diverging beam 18 is collimated by a group of lenses 21 to form the parallel beam 13 of measuring light having substantially flat wave fronts. Beam 13 traverses an interferometer optics 15 which transforms and shapes the beam 13 of measuring light such that the beam 13' supplied by the interferometer optics 15 and incident on the optical surface 3 has wave fronts of a shape which corresponds to a target shape of optical surface 3 at each position thereof. Thus, if the optical surface 3 is machined such that its surface shape corresponds to the target shape, the light of beam 13' is orthogonally incident on the optical surface 3 at each location thereof. The light reflected from the optical surface 3 will then travel back substantially the same way as it was incident on the optical surface 3, traverse the interferometer optics 15, and a portion thereof will be reflected from a beam splitter 31 disposed in the portion of the beam 13 of measuring light where beam 13 is the parallel beam having the flat wave fronts. A beam 29 reflected from the beam splitter 31 is imaged onto a photo sensitive surface 37 of a camera chip 39 through an objective lens system 35 of a camera 34, such that the optical surface 3 is imaged onto the camera 39.

The interferometer optics 15 comprises a wedge shape substrate 17 having a flat surface 19 which is oriented orthogonally to the parallel beam 13 of measuring light having traversed substrate 17. Surface 19 forms a Fizeau surface of interferometer system 1 in that it reflects a portion of the beam 13 of measuring light. The reflected portion of the beam 13 of measuring light forms reference light for the interferometric method. The reference light reflected back from Fizeau surface 19 travels back a same path as it was incident on surface 19, and is thus superimposed with the measuring light reflected from optical surface 3. The reference light is also deflected by beam splitter 31 and imaged onto the photo sensitive surface 37 of camera 39, such that an interference pattern generated by superimposing the wave fronts reflected from the optical surface 3 and the wave fronts reflected back from Fizeau surface 19 may be detected by camera 39.

As mentioned above, the interferometer optics 15 is designed such that it transforms the entering beam 13 of measuring light having the parallel wave fronts into the beam 13' of measuring light having the aspherical wave fronts at the position of the optical surface 3. For this purpose, the interferometer optics 15 comprises a substrate 23 having two parallel flat surfaces wherein one surface 25 disposed opposite to the optical surface 3 carries a hologram. The hologram is a computer generated hologram (CGH) designed such that it diffracts the beam 13 having the flat wave fronts exactly such that the wave fronts in the beam 13' at the position of the optical surface 3 will have a shape which substantially corresponds to the target shape of the optical surface 3. The hologram may be generated by exposing a photographic plate to reference light and light reflected from an optical surface having a surface corresponding to the target shape to a high accuracy, or, the hologram may be generated by calculating a corresponding grating using a computer involving methods such as ray tracing and plotting the calculated grating on surface 25 of the substrate. The grating may be formed by a lithographic method, for example. Background information with respect to holograms used in interferometry may be obtained from Chapter 15 of the above mentioned text book of Daniel Malacara.

The manufacture of hologram 25 of an arbitrary desired large size is impossible, and with a technology commercially available today, substrates carrying the hologram are limited to square shaped substrates of 6 inch×6 inch, such that the hologram which may be used when a necessary peripheral portion is provided is limited to diameters of less than about 140 mm.

The diameter of the optical surface 3 is greater than the diameter of the hologram 25 and greater than the diameter of measuring beam 13' when it emerges from the hologram. In particular, the diameter of the optical surface 3 is about 1.8 times the diameter of the hologram 25. The beam of measuring light 13' illuminates only a portion 27 of optical surface 3 at a same time. Portion 27 may also be referred to as a sub-aperture forming a portion of optical surface 3 when the same is referred to as the "full" aperture.

The interferometric method for testing the optical surface 3 now includes performing an interferometric measurement of sub-aperture 27 shown in FIG. 1, rotating the test piece holder 7 and the optical surface 3 fixed thereon about axis 9 by an angle of about 30°, and performing a next interferometric measurement of a sub-aperture 1 which is then illuminated by incident beam 13' of measuring light. By repeating such rotating of the optical surface 3 and performing the interferometric measurement of the illuminated sub-aperture, it is possible that substantially all locations on the optical surface 3 are tested one or plural times.

FIG. 2 shows an arrangement of the successively tested sub-apertures $27, 27_1, \ldots, 27_{11}$ on the optical surface 3 of mirror 5.

The measurement data derived from each of the interferometric measurements of sub-apertures $27, 27_1, \ldots, 27_{11}$ are processed such that a surface shape of the whole full aperture surface 3 is calculated. Such repeated interferometric testing of sub-apertures and translating the measured optical surface, and processing of measurement data is referred to as stitching interferometry, as already mentioned above with reference to the article of M. Bray.

However, the above illustrated embodiment allows the application of the method of stitching interferometry to testing aspherical surfaces by using the hologram for generating wave fronts of a suitable shape corresponding to the sub-aperture of the whole full aperture surface and by laterally displacing or rotating the optical surface about its axis of symmetry between subsequent interferometric measurements.

In the embodiment of FIG. 1, the beam 13' of measuring light illuminates a central region on the optical surface 3 which coincides with the axis of rotation 9 and axis of symmetry of optical surface 3, respectively. Thus, the central region of the optical surface 3 is measured with each measurement of one of the sub-apertures $27, 27_1, \ldots, 27_{11}$ which allows for a precise verification of the results of the data processing. However, it is also possible that the sub-apertures $27, 27_1, \ldots$, are disposed at a distance from the axis of symmetry 9 such that the plurality of sub-apertures $27, 27_1, \ldots, 27_{11}$ covers a ring shaped multi-overlapped portion of the optical surface 3.

FIG. 3 illustrates a portion of a further interferometer system 1a for testing an aspherical optical surface 3a which is mounted on a test piece holder to be rotatable about an axis 9a. Details of components such as a light source, a camera, and the test piece holder are not shown in FIG. 3 for simplicity reasons. A parallel beam 13a of measuring light having substantially flat wave fronts traverses an interferometer optics 15a to be orthogonally incident at each illuminated location on aspherical surface 3a. In particular, the beam 13a traverses a Fizeau surface 19a and is deflected by a hologram 25a provided on a surface of the substrate 23a. Beam 13a' emerging from the hologram 25a then traverses a lens 51 having two spherical surfaces 52, 53 of positive refractive power before the beam 13a" emerging from lens 51 is incident on a sub-aperture 27a of optical surface 3a. The hologram 25a and the lens 51 have a diffractive and refractive optical power, respectively, such that the light of beam 13a" is orthogonally incident on aspherical surface 3a at each location thereof.

For testing the whole surface of optical surface 3a, a method of repeatedly taking an interferometric measurement of a sub-aperture and of rotating the optical surface 3a as illustrated above is performed.

Figure 4:
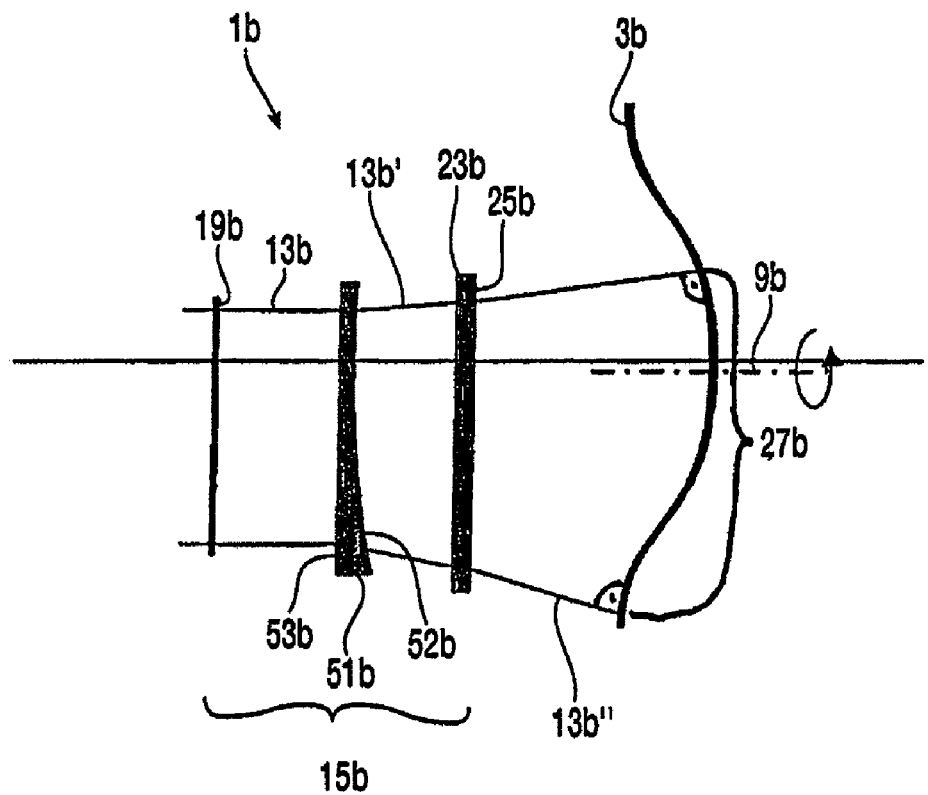
FIG. 4 schematically illustrates a portion of an interferometer system for testing an optical element according to a third embodiment of the invention.

FIG. 4 shows a further embodiment of a portion of an interferometer system 1b which is similar to the embodiment shown in FIG. 3. However, in the embodiment of the interferometer system 1b shown in FIG. 4, a lens 51b having a flat surface 53b and an off-axis spherical surface 52b is disposed in a portion of beam 13b' of measuring light upstream of a substrate 23b carrying a hologram 25b. The hologram 25b and the lens 51b are designed such that a beam 13b" emerging from the hologram 25b is orthogonally incident on aspherical surface 3b at each location thereof within an illuminated region or sub-aperture 27b.

In other embodiments, the lens 51b may be an off-axis lens in a general sense such that one or both surfaces thereof are off-axis surfaces of a spherical or aspherical shape.

Figure 5:
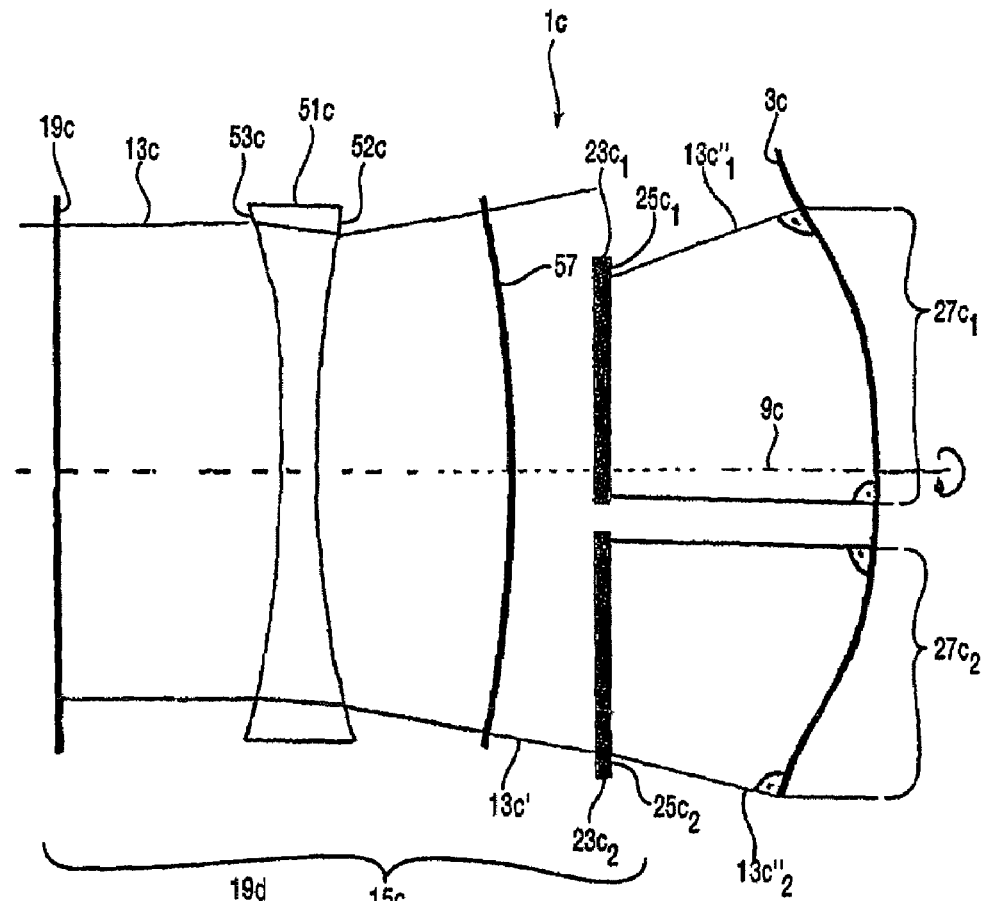
FIG. 5 schematically illustrates a portion of an interferometer system for testing an optical element according to a fourth embodiment of the invention.

A portion of an interferometer system 1c illustrated in FIG. 5 comprises an interferometer optics 15c having a Fizeau surface 19c traversed by a beam 13c of measuring light having substantially flat wave fronts, and a lens 51c having two concave spherical surfaces 52c, 53c transforming the parallel beam 13c into a diverging beam 13c' having substantially spherical wave fronts as indicated by a line 57 in FIG. 5. Two substrates $23c_1$ and $23c_2$ are fixedly disposed adjacent to each other within a beam path of beam $13c'$, and each of substrates $23c_1$ and $23c_2$ carries a hologram $25c_1$ and $25c_2$, respectively. Each of the holograms $25c_1$ and $25c_2$ transforms a portion of beam $13c'$ into a beam $13c_1''$ and $13c_2''$, respectively, having aspherical wave fronts such that each of beams $13c_1''$ and $13c_2''$ is orthogonally incident on an aspherical surface $3c$ to be tested, at each location thereof within a respective sub-aperture $27c_1$ and $27c_2$, respectively.

Thus, with a configuration of the interferometer system $1c$ as shown in FIG. 5, it is possible to obtain interferometric data of two sub-apertures $27c_1$ and $27c_2$ at the same time. By obtaining such data at plural rotational positions of optical surface $3c$ about an axis of symmetry $9c$ thereof, and by stitching together the measuring results it is possible to obtain a shape of large optical surface $3c$ while using holograms $25c_1$ and $25c_2$ of a relatively small diameter.

Figure 6:
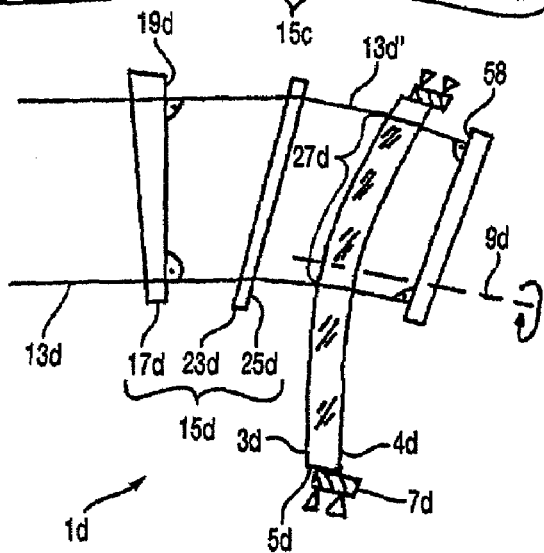
FIG. 6 schematically illustrates a portion of an interferometer system for testing an optical element according to a fifth embodiment of the invention.

Interferometer system $1d$ illustrated in FIG. 6 has an interferometer optics $15d$ having a similar configuration as that shown in FIG. 1. A beam $13d$ having flat wave fronts traverses a Fizeau surface $19d$ and is transformed by a hologram $25d$ carried on a substrate $23d$ into a beam $13d'$ having aspherical wave fronts and being incident on a lens $5d$ to be tested. Lens $5d$ has an optical surface $3d$ opposite to substrate $23d$ carrying the hologram $25d$, and an optical surface $4d$. Other than in the embodiment shown in FIG. 1, the beam $13d'$ of measuring light used in the interferometric measurement is not reflected from optical surface $3d$ opposite to the hologram $25d$. Moreover, beam $13d'$ traverses the lens $5d$ and is reflected from a mirror 58 disposed downstream of lens $5d$ in the beam path of beam $13d'$ of measuring light. The hologram is designed such that it compensates an effect of lens $5d$ on the beam $13d'$ traversing the same, such that the light of the beam $13d'$ incident on mirror 58 is orthogonally incident thereon at each location thereof. Again, beam $13d'$ of measuring light is incident on only a portion or sub-aperture $27d$ of the whole surface $3d$. Interferometric measuring data are obtained for plural sub-apertures $27d$ by rotating the lens $5d$ about an axis of rotation $9d$ of a test piece holder $7d$ on which the lens $5d$ is mounted. The measurement data obtained at the plural rotational positions about axis $9d$ are stitched together to obtain measurement data representing an effect which the lens $5d$ has on a beam traversing the lens $5d$. Such effect is determined by a shape of surfaces $3d$ and $4d$ of the lens $5d$ and by a refractive index and an inhomogeneity thereof of the material of lens $5d$. Based on such determination of the optical effect of the lens $5d$, a further machining of surface $3d$ and $4d$ may be planned.

Figure 7:
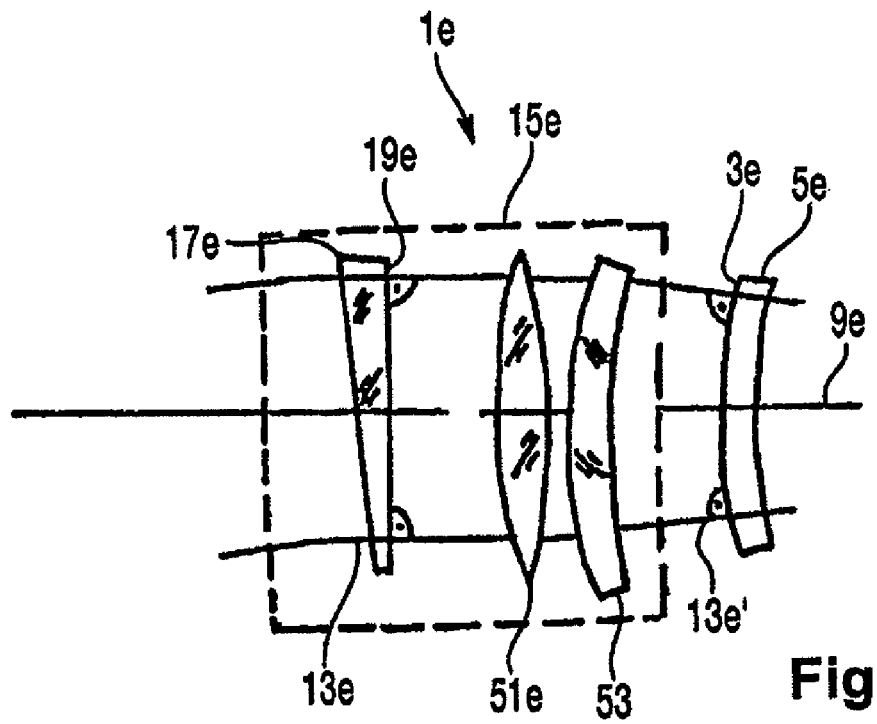
FIG. 7 illustrates a portion of the interferometer system for testing an optical surface.

FIG. 7 shows a portion of an interferometer system $1e$ for testing an optical surface $3e$ of an optical element $5e$. A target shape of optical surface $3e$ is rotationally symmetric with respect to an axis $9e$. An interferometer optics $15e$ comprises a Fizeau surface $19e$ and two lenses $51e$ and 53 having spherical surfaces which are also rotationally symmetric with respect to axis $9e$. Lenses $51e$ and 53 transform a beam $13e$ of measuring light having substantially flat wavefronts into a beam $13e'$ having aspherical wavefronts such that they substantially correspond to a target shape of optical surface $3e$ at the surface, i.e. light of the beam $13e'$ is orthogonally incident on the surface $3e$ at each location thereof. Beam $13e'$ of measuring light illuminates the full aperture of optical surface $3e$. The interferometer optics $15e$ shown in FIG. 7 does not comprise a hologram, and the aspherical wavefronts of beam $13e'$ are only generated due to the effect of lenses $51e$ and 53. Thus, the beam of measuring light $13e'$ can have a high diameter limited only by a diameter of lenses $51e$ and 53 and not by an availability of large diameter holograms. Thus, even comparatively large optical surfaces $3e$ may be tested without the necessity of using a method of stitching interferometry. The interferometer optics $15e$ as far as it is illustrated above corresponds, in principal, to conventional interferometry.

An underlying problem with such interferometer optics including a Null-lens-system or a compensator for generating aspherical wavefronts is, however, that the desired accurate performance of the optics in view of generating the aspherical wavefronts of the desired shape is not so easy to verify.

Figure 8:
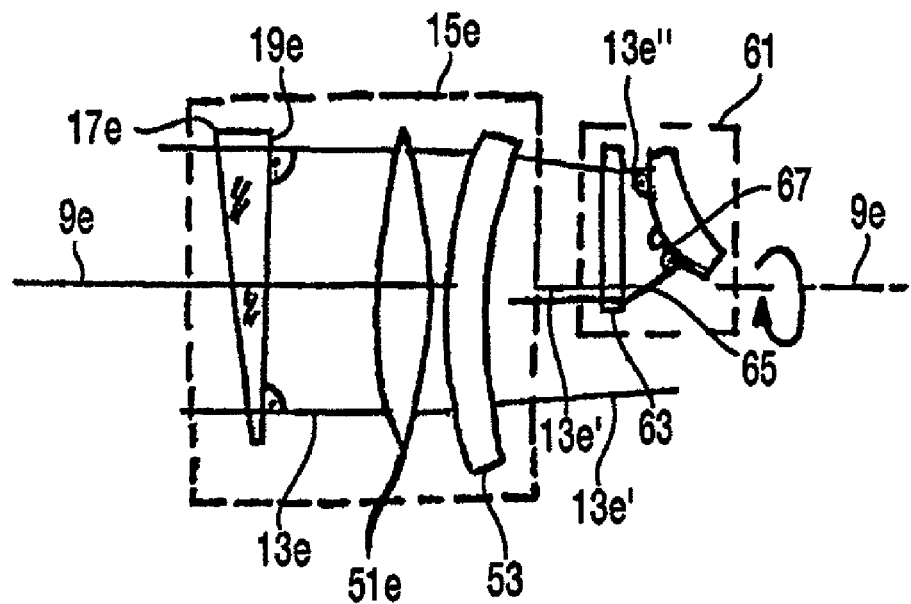
FIG. 8 illustrates a method of calibrating an interferometer optics of the interferometer system shown in FIG. 7 according to a sixth embodiment of the invention.

FIG. 8 shows an arrangement for calibrating the interferometer optics $15e$. For this purpose, the optical element $5e$ to be tested is removed from the beam path of beam $13e'$, and a calibrating optics 61 is disposed therein. The calibrating optics 61 comprises a substrate 63 carrying on one of its flat surfaces a hologram 65. An area of the hologram 65 is less than an area of a cross section of beam $13e$ at the position where the substrate 63 is arranged. Thus, only a portion of beam $13e'$ is incident on the hologram 65, or the hologram 65 covers only a sub-aperture of the full aperture of beam $13e'$. The portion of beam $13e'$ having the aspherical wavefronts is transformed by the hologram 65 into a beam $13e''$ having spherical wavefronts, and beam $13e''$ is then orthogonally incident on a spherical mirror surface 67. The mirror has been tested and manufactured to a high accuracy. Beam $13e''$ is reflected from the mirror surface 67 and travels backwards through hologram 65 and substrate 63 and enters the interferometer optics $15e$ on a same beam path as the portion of beam $13e'$ was incident on the hologram 65. For this purpose, the hologram and the arrangement of mirror 67 are calculated and designed such that the calibrating optics 61 has a same effect on the portion of beam $13e'$ as the optical surface $3e$ of the optical element $5e$ would have on the portion of beam $13e'$ if the optical element $5e$ was arranged in beam $13e'$ as shown in FIG. 7.

A detected interference pattern of the arrangement shown in FIG. 8 is indicative of deviations of the wavefronts generated by interferometer optics $15e$ from a desired shape of such wavefronts. However, such deviations are only indicative for a portion or sub-aperture of the whole beam $13e'$ of measuring light. To obtain full data relating to distortions of the wavefronts generated by interferometer optics $15e$ covering the full aperture of beam $13e$, the calibrating optics 61 is mounted on a suitable mount not shown in FIG. 8 to be rotatable about axis $9e$. After taking the interferometric measurement of the sub-aperture of beam $13e'$ as shown in FIG. 8, the calibrating optics 61 is then repeatedly rotated by e.g. 30° about axis $9e$, and interferometric measurements are taken at each rotational position of calibrating optics 61. The resulting measurements are stitched together to generate a map representing wavefront deviations on the full cross section of beam $13e'$ from their desired shape. These deviations of wavefronts are taken into account when evaluating the interferometric measurement of the optical surface $3e$ of optical element $5e$ when the optical surface $3e$ is measured in the arrangement as shown in FIG. 7. For example, the resulting deviation of wavefronts may be subtracted from a result of the measurement of the shape of optical surface $3e$.

The above method applies a stitching interferometric method to calibrating interferometer optics $15e$ and allows to calibrate the interferometer optics $15e$ having large diameter lenses $51e$ and 53 with a hologram 65 of a substantially smaller size.

In the embodiment shown in FIG. 7, the interferometer optics comprises only lenses $51e$ and 53. However, other embodiments of the interferometer optics may also comprise a hologram to generate the beam $13e'$ of measuring light having aspherical wavefronts.

Figure 9:
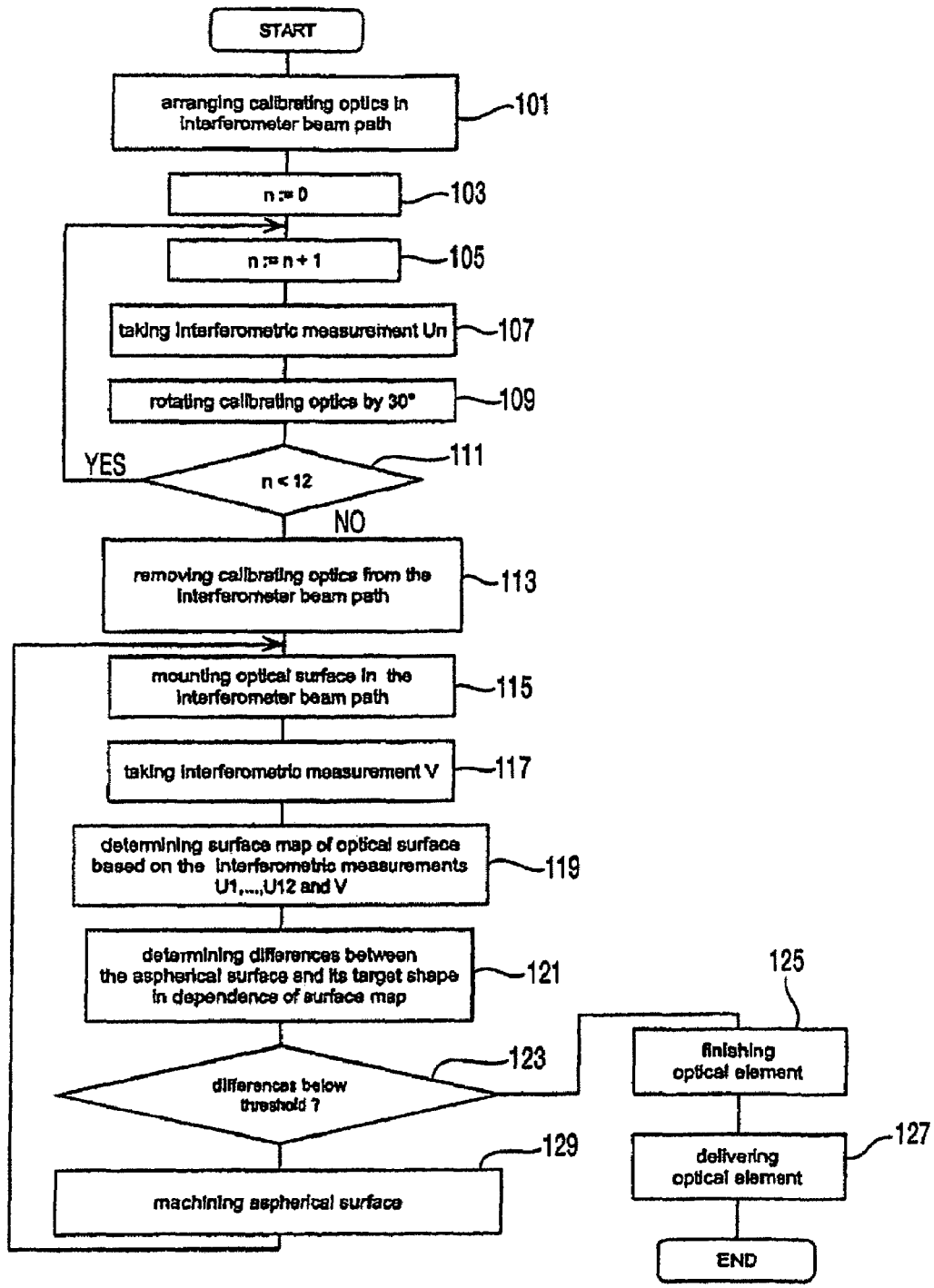
FIG. 9 is a flow chart of a method for manufacturing the optical element shown in FIG. 7.

A method of manufacturing the aspherical surface $3e$ to a high accuracy is illustrated with reference to the flowchart shown in FIG. 9. After starting the procedure, the calibrating optics 61 is arranged in the beam path of beam $13e'$ in a step 101, and a counter n is set to zero in a step 103. The counter is incremented in a step 105, and a first interferometric measurement $U_1$ is taken in a step 107. Thereafter, the calibrating optics 61 is rotated about axis $9e$ by 30° in a step 109, and a decision ill is made to determine whether all necessary calibrating measurements have been performed. If counter n is below 12, processing is continued at step 105 to repeatedly taking further interferometric measurements $U_n$ (step 107) and further rotating the calibrating optics (step 109). After completing the calibrating measurements when a value of the counter n is 12 in decision step 111, the processing is continued by removing the calibrating optics from the interferometer beam path at step 113 and mounting the optical element $5e$ with the optical surface $3e$ to be tested in the beam $13e'$ generated by the interferometer optics $15e$ at a step 115. An interferometric measurement V of optical surface $3e$ is performed in a step 117, and a surface map of the optical surface is determined in a step 119. This determination of the surface map is based on the measurement V of the optical surface $3e$ and the calibrating measurements $U_1, \ldots U_{12}$. For this purpose, the calibrating measurements $U_1, \ldots U_{12}$ may first be processed to determine deviations U of the whole cross section of beam $13e'$, and the result U may then be processed together with the measurement V to determine the surface map. However, it is also possible to process the measurements $U_1, \ldots U_{12}$ and V in one single operation to determine the surface map of the optical surface.

Differences between the measured shape of the aspherical surface and its target shape are calculated in a step 121, based on the surface map determined in step 119. In a step 123, a decision is made as to whether the tested aspherical surface corresponds to the specification for the finished optical surface $3e$. If the differences are below suitably chosen thresholds, a finishing step 125 is performed on the aspherical surface $3e$. The finishing may include a final polishing of the surface $3e$ or depositing a suitable coating, such as a reflective coating, an anti-reflective coating, and a protective coating applied to the optical surface $3e$ by suitable methods, such as sputtering. The reflective coating may comprise, for example, a plurality of layers, such as ten layers of alternating dielectric materials, such as molybdenum oxide and silicon oxide. Thicknesses of such layers may be about 5 nm and will be adapted to a wavelength to be reflected from the optical surface, such that a reflection coefficient is substantially high. Finally, the reflective coating may be covered by a protective cap layer for passivating the reflective coating. The cap layer may include a layer formed by depositing materials such as ruthenium. The anti-reflective coating which is intended to reduce reflections of radiation from the optical surface of the optical element, such as a lens element, may include materials, such as magnesium fluoride, lanthanum oxide and other suitable materials. Also the anti-reflective coating may be passivated by a protective cap layer.

If the determined differences are below the thresholds in step 123, processing is continued at a step 129 of machining the optical surface. For this purpose, the optical element $5e$ is removed from the beam path of the interferometer optics $1e$ and mounted on a suitable machine tool to remove those surface portions of the optical surface $3e$ at which differences between the determined surface shape and the target shape exceed the threshold. Thereafter, processing is continued at step 115 and the optical element is again mounted in the beam $13e'$ of measuring light in the interferometer system $1e$, and the measurement of the surface shape of optical surface $3e$, determining differences from the target shape and machining is repeated until the differences are below the thresholds.

The machining may include operations such as milling, grinding, loose abrasive grinding, polishing, ion beam figuring and magneto-rheological figuring.

After the optical surface $3e$ is finished in step 125, the optical element is delivered and incorporated in an optical system in a step 127. Thereafter a next optical element $5e$ to be tested is mounted in the interferometer beam path in a step 115 and repeated measuring and machining of such next surface is performed until this surface fulfils the specifications.

Thus, the interferometer optics $115e$ may be calibrated only once and is then used for testing plural optical elements.

The above threshold values will depend on the application of the optical surface in the optical system for which it is designed. For example, if the optical surface is a lens surface in an objective for imaging a reticle structure onto a resist with radiation of a wavelength $\lambda=193$ nm, such threshold value may be in a range of about 1 nm to 10 nm, and if the optical surface will be used as a mirror surface in an imaging objective using EUV (extreme ultraviolet) radiation with a wavelength of $\lambda=13.5$ nm, the threshold value will be in a region of about 0.1 nm to 1.0 nm. It is to be noted that it is not necessary that the above mentioned threshold is a constant threshold over the whole area of the optical surface. It is possible that the threshold is dependent on e.g. a distance from a center of the optical surface or some other parameters. In particular, plural thresholds may be defined each for different ranges of spatial frequencies of differences between the measured surface and its target shape.

The method of manufacturing the optical element was illustrated above with reference to FIGS. 7 to 9, i.e. with respect to an embodiment comprising a calibration of the interferometer optics by using a sub-aperture calibrating optics having a hologram. Steps 115 to 129 of the flowchart of FIG. 9 may be also applied to manufacture of the optical surface tested in the embodiments illustrated with reference to FIGS. 1 to 6 above. Herein, the interferometric measurement V (step 117 of FIG. 9) will comprise taking the plurality of interferometric measurements at the plurality of rotational positions of the optical element, and the determination of the surface map (step 119 of FIG. 9) will be based on such plurality of interferometric measurements. The details of machining given above with respect to the embodiment shown in FIG. 9 are also applicable to the manufacture of lenses tested by sub-aperture interferometric measurements at plural rotational positions of the optical element.

Figure 10:
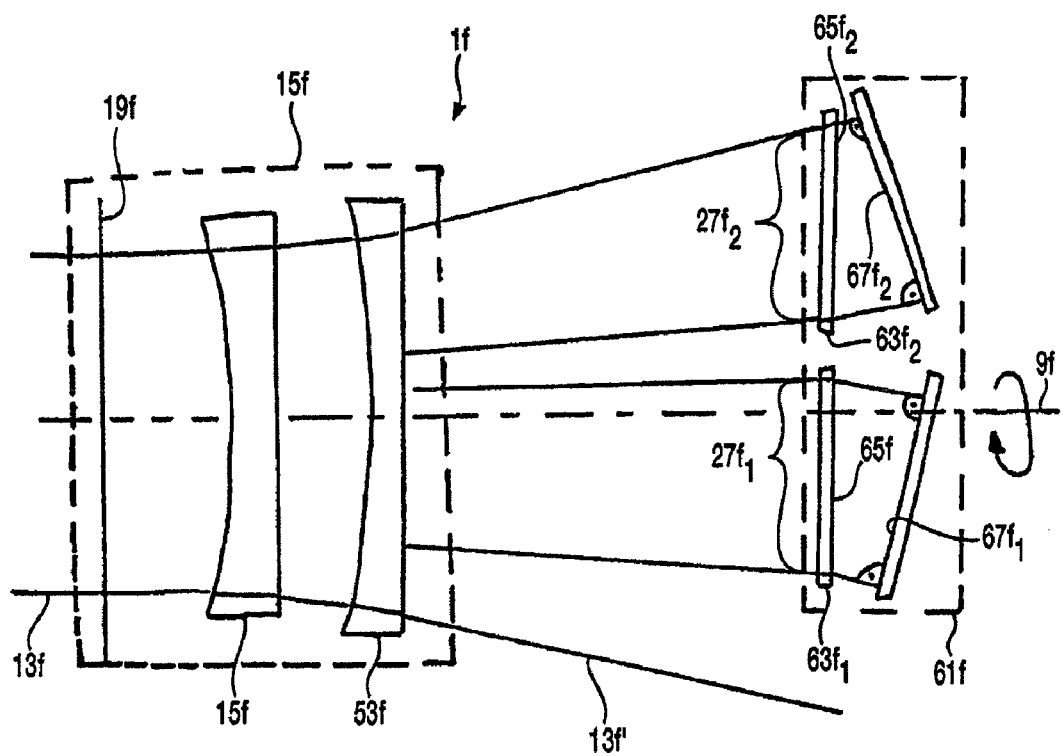
FIG. 10 illustrates a further method of calibrating an interferometer optics according to a seventh embodiment of the invention.

FIG. 10 shows a further embodiment of calibrating an interferometer optics $15f$ used in an interferometer system $1f$ wherein only a portion of the interferometer system $1f$ is shown in FIG. 10. Similar to the embodiment illustrated with reference to FIGS. 7 and 8, the interferometer optics $15f$ comprises a Fizeau surface $19f$ and two lenses $15f$ and $53f$ for generating a beam $13f$ of measuring light having substantially aspherical wavefronts. A calibrating optics $61f$ is disposed in a portion of beam $13f$. Calibrating optics $61f$ is rotatable about an axis $9f$. The calibrating optics $61f$ comprises two holograms $65f_1$ and $65f_2$ carried by respective substrates $63f_1$ and $63f_2$. Each hologram $65f_1$, $65f_2$ is of a small size when compared to the full cross section of beam $13f$ such that only sub-apertures $27f_1$ and $27f_2$ of the full cross section of beam $13f$ are incident on the hologram $65f_1$ and $65f_2$. The portions of beams $13f$ incident on the holograms $65f_1$, $65f_2$ are transformed to parallel beams having substantially flat wavefronts which are orthogonally incident on respective mirrors $67f_1$ and $67f_2$. An interferometric measurement of sub-apertures $27f_1$ and $27f_2$ is performed in the configuration as shown in FIG. 10, and thereafter the calibrating optics $61f$ is repeatedly rotated about axis $9f$ and interferometric measurements are performed at each rotational position of calibrating optics $61f$.

The holograms $65f_1$ and $65f_2$ are designed and calculated such that the sub-aperture beams reflected from mirrors $67f_1$, $67f_2$ have, when re-entering the interferometer optics $15f$, substantially the same shapes of wavefronts as the beam would have if the optical element to be tested was arranged in the beam $13f$ of measuring light.

It is also possible to mount the holograms $63f_1$, $63f_2$ and mirrors $67f_1$, $67f_2$ on separate calibrating optics which are not simultaneously mounted in the beam of measuring light. The calibration using the hologram $63f_1$ and mirror $67f_1$ may then be performed after a calibration using hologram $63f_2$ and mirror $67f_2'$.

In the embodiments illustrated with reference to FIGS. 5 and 10 above, the substrates carrying the holograms are shown such that they are disposed at a distance from each other. While the substrates will be disposed at a limited distance from each other, it is possible to arrange the substrates such that they are offset from each other in a circumferential direction but overlapping in a radial direction with respect to the axis of rotation. With such arrangement there exists an overlapping portion in the beam of measuring light which is covered by sub-aperture measurements of both holograms which allows stitching of the sub-aperture measurements with an increased accuracy. Further, more than two holograms may be used in the embodiments shown in FIGS. 5 and 10.

In the above embodiments, the optical surface to be tested is an aspherical optical surface. It is to be noted, however, that the illustrated methods may be also applied to testing spherical or flat surfaces. The spherical surface may be understood as a generalized aspherical surface of a particular type.

In the embodiments illustrated above, the optical surfaces to be tested are surfaces of a rotationally symmetric shape wherein the optical element is also rotationally symmetric with respect to an axis of rotation. The invention is, however, not limited thereto. The optical elements to be tested may be off-axis optical elements, which means that the optical surface is only a portion of a rotationally symmetric shape wherein the axis of rotational symmetry of the shape does not coincide with a center of the optical element or the optical surface, provided thereon. In particular, the axis of rotational symmetry of the shape may be disposed outside of the optical element.

In the above illustrated embodiments, the interferometer systems are of a Fizeau type. It is to be noted, however, that the invention is not limited to such type of interferometer. Any other type of interferometer, such as a Twyman-Green-type of interferometer, examples of which are illustrated in chapter 2.1 of the text book edited by Daniel Malacara, Optical Shop Testing, 2nd edition, Wiley interscience Publication (1992), a Michelson-type interferometer, examples of which are illustrated in chapter 2.1 of the text book edited by Daniel Malacara, a Mach-Zehnder-type of interferometer, examples of which are illustrated in chapter 2.6 of the text book edited by Daniel Malacara, a point-diffraction type interferometer, examples of which are illustrated in U.S. Pat. No. 5,548,403 and in the article "Extreme-ultraviolet phase-shifting point-diffraction interferometer: a wavefront metrology tool with subangstrom reference-wave accuracy" by Patrick P. Naulleau et al., Applied Optics-IP, Volume 38, Issue 35, pages 7252 to 7263, December 1999, and any other suitable type of interferometer may be used.

It is further to be noted that the optical components involved in the above interferometric methods are subject to gravity during measurement. This may result in deformations of the surfaces of those components which are fixed in suitable mounts for arranging the components within the beam path of the interferometer. Even though the optical axis is oriented horizontally in FIGS. 1 to 8 and 10, it is also possible to perform the same measurements with an optical axis oriented vertically or in any other direction in the gravitational field. In any event, it is possible to use mathematical methods to simulate deformations of the optical components in the gravitational field. One such method is known as FEM (finite element method). All determinations of optical properties and deviations illustrated above may involve taking into account results of such mathematical methods for correcting and/or improving the determined results.

Summarized, a method of manufacturing an optical element includes testing the optical element by using an interferometer optics generating a beam of measuring light illuminating only a sub-aperture of the tested optical element. The interferometer optics comprises a hologram. Results of the sub-aperture measurement are stitched together to obtain a measuring result with respect to the full surface of the optical element. Further, a method of calibrating the interferometer optics includes performing an interferometric measurement using a calibrating optics having a hologram covering only a sub-aperture of the full cross section of the beam of measuring light generated by the interferometer optics and stitching together the sub-aperture measurements to obtain a result indicative for the full cross section of the interferometer optics.

The present invention has been described by way of exemplary embodiments to which it is not limited. Variations and modifications will occur to those skilled in the art without departing from the scope of the present invention as recited in the appended claims and equivalents thereof.

What is claimed is:

1. A method of manufacturing an optical element having an optical surface of an aspherical target shape having an axis of rotational symmetry, the method comprising:

directing a beam of measuring light onto the optical surface using an interferometer optics, the interferometer optics comprising at least one substrate carrying a hologram, wherein at least a portion of the beam of measuring light traverses the at least one substrate carrying the hologram, wherein the portion traversing the substrate illuminates only a portion of the optical surface, and wherein an area of the illuminated portion on the optical surface is less than about 80% of a total area of the optical surface;

positioning the optical surface at plural rotational positions about an axis of rotation which substantially coincides with the axis of rotational symmetry of the target shape of the optical surface, and performing at least one first interferometric measurement at each of the plural rotational positions of the optical element by superimposing reference light with measuring light having interacted with the illuminated portion on the optical surface;

determining deviations of the optical surface from its target shape based on the first interferometric measurements taken at the plural rotational positions of the optical element; and processing the optical surface of the optical element based on the determined deviations, wherein plural substrates, each carrying a hologram, are disposed adjacent to each other such that each substrate is traversed by a separate portion of the beam of measuring light.

2. The method according to claim 1, wherein the illuminated portion of the optical surface includes a region about the axis of rotational symmetry.

3. The method according to claim 1, wherein the interferometer optics further comprises at least one first lens traversed by the beam of measuring light and disposed upstream of the hologram in the beam of measuring light, and wherein the at least one first lens has a rotationally symmetric shape with respect to an optical axis.

4. The method according to claim 3, wherein the substrate is a substantially flat substrate extending in a plane oriented at an angle different from 90° with respect to the optical axis of the at least one first lens.

5. The method according to claim 3, wherein the axis of rotation is parallel to the optical axis.

6. The method according to claim 1, wherein the interferometer optics further comprises at least one second lens traversed by the beam of measuring light and disposed downstream of the hologram in the beam of measuring light.

7. A method of manufacturing an optical element having an optical surface of an aspherical target shape having an axis of rotational symmetry, the method comprising:

directing a beam of measuring light onto a calibrating optics using an interferometer optics, the calibrating optics comprising at least one substrate carrying a hologram, wherein only a portion of the beam of measuring light is incident on the at least one substrate, and wherein an area of the substrate is less than about 80% of an area of a cross section of the beam of measuring light at a position of the substrate;

positioning the calibrating optics at plural rotational positions about an axis of rotation, and performing at least one second interferometric measurement at each of the plural rotational positions of the calibrating optics by superimposing reference light with measuring light having interacted with the calibrating optics;

directing the beam of measuring light onto the optical surface while the calibrating optics is removed from the beam of measuring light, and performing at least one first interferometric measuring by superimposing the reference light with measuring light having interacted with the optical surface;

determining deviations of the optical surface from its target shape based on the second interferometric measurements taken at the plural rotational positions of the calibrating optics and the at least one first interferometric measurement; and processing the optical surface of the optical element based on the determined deviations, wherein the calibrating optics comprises plural substrates, each carrying a hologram, and disposed adjacent to each other such that a separate portion of the beam of measuring light is incident on each substrate.

8. The method according to claim 7, wherein the axis of rotation intersects the at least one substrate.

9. The method according to claim 7, wherein the calibrating optics further comprises a mirror disposed at a distance from the substrate carrying the hologram.

10. The method according to claim 9, wherein the mirror is a convex mirror.

11. The method according to claim 7, wherein the interferometer optics further comprises at least one first lens traversed by the beam of measuring light, and wherein the at least one first lens has a rotationally symmetric shape with respect to an optical axis.

12. The method according to claim 11, wherein the axis of rotation is parallel to the optical axis of the at least one first lens.

13. The method according to claim 1, wherein the beam of measuring light is reflected from the optical surface.

14. The method according to claim 1, wherein the beam of measuring light traverses the optical surface.

15. The method according to claim 1, wherein the interferometer optics comprises a Fizeau surface from which the reference light is reflected and which is traversed by the beam of measuring light.

16. The method according to claim 1, wherein the processing of the optical surface of the optical element comprises at least one of milling, grinding, loose abrasive grinding, polishing, ion beam figuring, magneto-rheological figuring, reactive ion beam etching, and finishing the optical surface of the optical element.

17. The method according to claim 16, wherein the finishing comprises applying a coating to the optical surface.

18. The method according to claim 17, wherein the coating comprises at least one of a reflective coating, an anti-reflective coating and a protective coating.

* * * * *